United States Patent [19]
Liu

[11] Patent Number: 5,865,533
[45] Date of Patent: Feb. 2, 1999

[54] IMITATED FIREWORKS BULB SET FOR CHRISTMAS TREE DECORATION

[76] Inventor: John Fuu Liu, 21051 Red Jacket Cir., Hungtington Beach, Calif. 92646

[21] Appl. No.: 25,626

[22] Filed: Feb. 18, 1998

[51] Int. Cl.$^6$ .................................................. F21V 7/04
[52] U.S. Cl. ........................ 362/583; 362/293; 362/565; 362/580
[58] Field of Search ................................... 362/583, 565, 362/568, 580, 293, 294, 806

[56] References Cited

U.S. PATENT DOCUMENTS

| | | | |
|---|---|---|---|
| 3,727,044 | 4/1973 | Monroy | 362/806 X |
| 4,682,079 | 7/1987 | Sanders et al. | 362/806 X |
| 4,777,571 | 10/1988 | Morgan | 362/568 X |
| 5,558,421 | 9/1996 | Guastella | 362/565 |

*Primary Examiner*—Stephen Husar
*Attorney, Agent, or Firm*—David and Raymond; Raymond Y. Chan

[57] ABSTRACT

An imitated fireworks bulb set for Christmas tree decoration includes a plurality of imitated fireworks bulbs, a plug head having a transformer therein for electrical power supply, and an elongated electrical wire for electrically connecting the imitated fireworks bulbs to the plug head so as to connect the imitated fireworks bulbs together and provide electrical power to each of the imitated fireworks bulbs. Each of the imitated fireworks bulbs includes a bowl-like transparent shell, a casing connected to the transparent shell to form a container body, a hanger affixed to a top end of the casing, and an imitated fireworks generating device installed within the casing for rendering a plurality of optic fiber sticks disposed inside the transparent shell to provide fireworks like flashing effect at their light emitting tips.

19 Claims, 3 Drawing Sheets

5,865,533

IMITATED FIREWORKS BULB SET FOR CHRISTMAS TREE DECORATION

BACKGROUND OF THE PRESENT INVENTION

The present invention relates to decorative articles for Christmas tree, and more particularly to an imitated fireworks bulb set for Christmas tree decoration which can provide fireworks like flashing effect Every Christmas, people spend a lot of money for decorating their Christmas tree simply because it is a special day for the whole family. However, it is impossible for anyone to play fireworks at home to celebrate the Christmas. Therefore, it would be an amazing idea to provide a kind of imitated fireworks bulb for decorating the Christmas tree.

It is well known in the decorative arts that optic fiber such as thermoplastic, coated glass, organic polymer materials can transmit light over flexible path. Numbers of devices such as U.S. Pat. No. 4,747,022 and 4,025,779 are equipped with the optic fibers to form all kinds of decorative lamp for desktop decoration. However, none of them can provide fireworks like flashing effect. Even though some of the optic fiber decorative lamps take use of a colorful rotating light filter disc that divides the disc surface into numbers of sections with different colors, they can merely provide a color changeable effect that the light beam emitting ends of the optic fibers can change lighting color periodically. Moreover, since the color change only depends on the sequence of the color sections on the filter disc, the users may soon feel tired of the predictable color change.

Besides, both the motor and the light bulb will generate plenty of heat, so that heat dissipation is one of the essential topics of designing the optic fiber decorative lamp. For the conventional desktop decorative lamp, the heat problem can simply solve by forming holes on the bottom wall of the housing. Since the holes formed at the bottom which sits on the desk and those desk top decorative lamps has relatively large size, it does not exist a light beam emitting problem. But, as a decorative article to be hanged on a Christmas tree, the heat dissipation problem becomes an unsolved difficulty.

SUMMARY OF THE PRESENT INVENTION

It is thus a first object of the present invention to provide an imitated fireworks bulb set for Christmas tree decorative of which each imitated fireworks bulb can perform fireworks like flashing effect with changeful colors by providing at least two partially overlapped colorful filter discs rotating in different speed with a single motor.

Another object of the present invention is to provide an imitated fireworks bulb set for Christmas tree decorative, in which the imitated fireworks bulb has a relatively compact size adapted for hanging on the Christmas tree while it has good heat dissipation ability.

DETAILED DESCRIPTION OF THE PREFERRED EMBODIMENT

Figure 1:
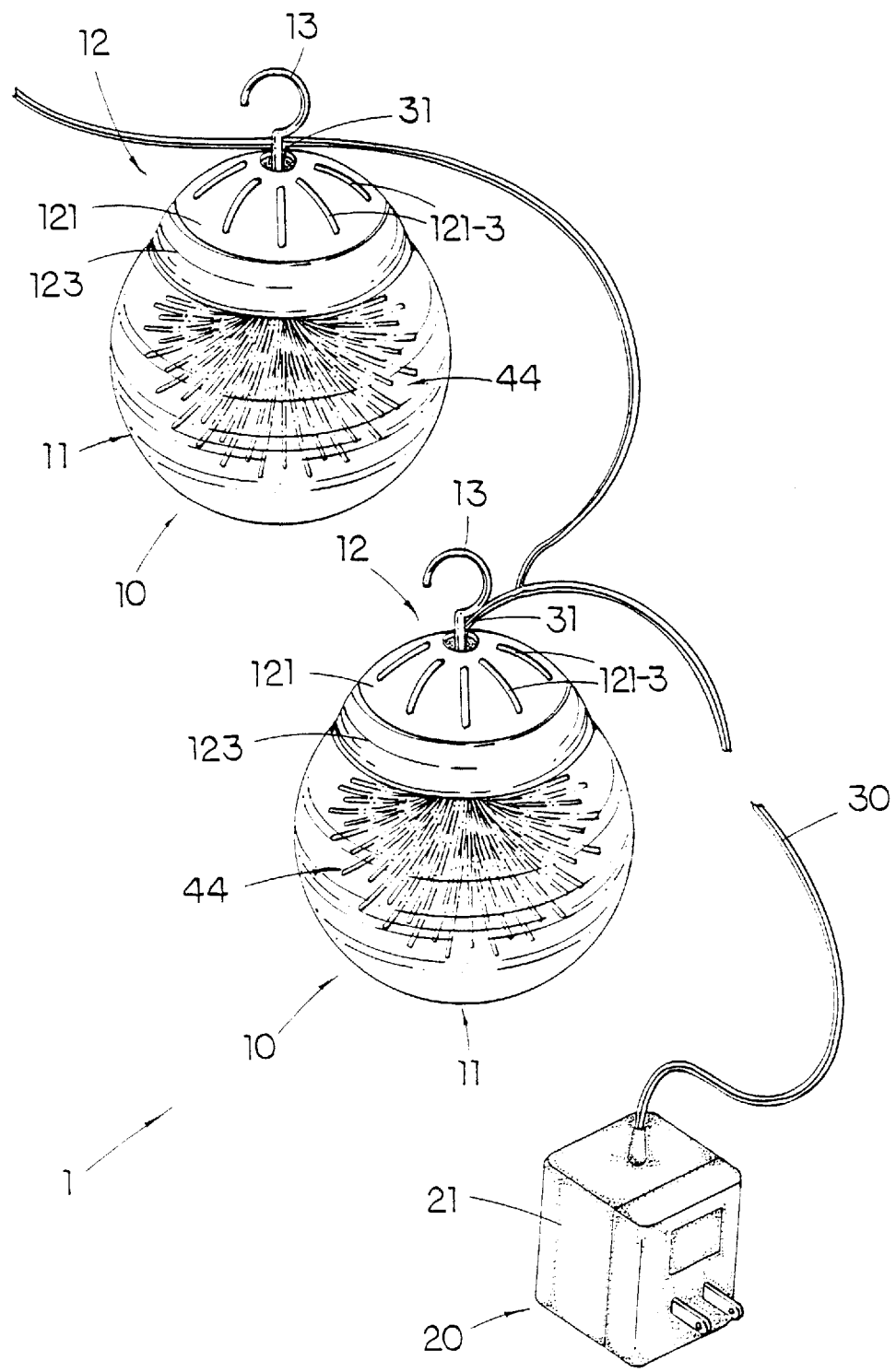
FIG. 1 is a perspective view of an imitated fireworks bulb set for Christmas tree decorative in accordance with the present invention.
Figure 2:
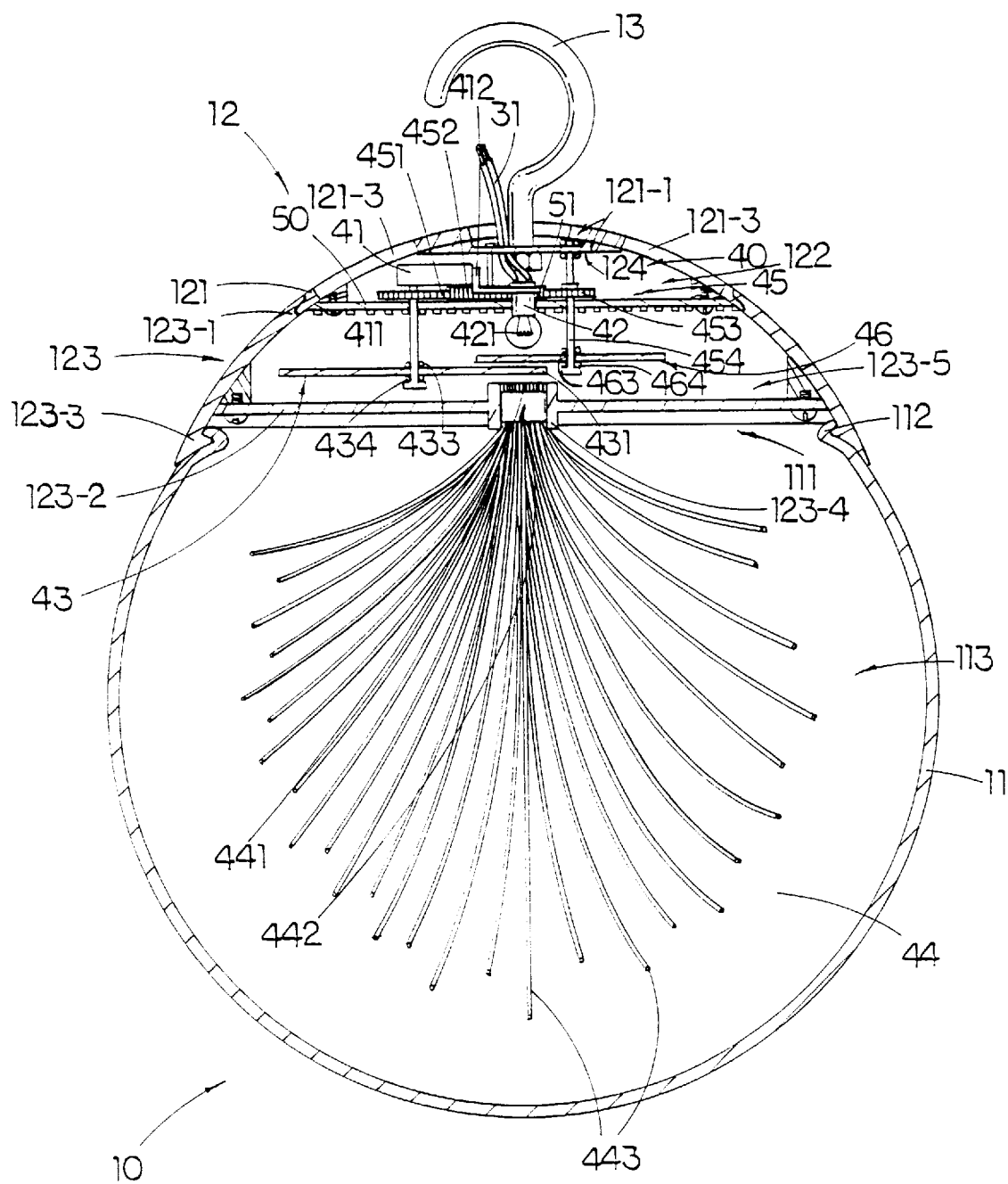
FIG. 2 is a sectional view of an imitated fireworks bulb according to the above preferred embodiment of the present invention.
Figure 3:
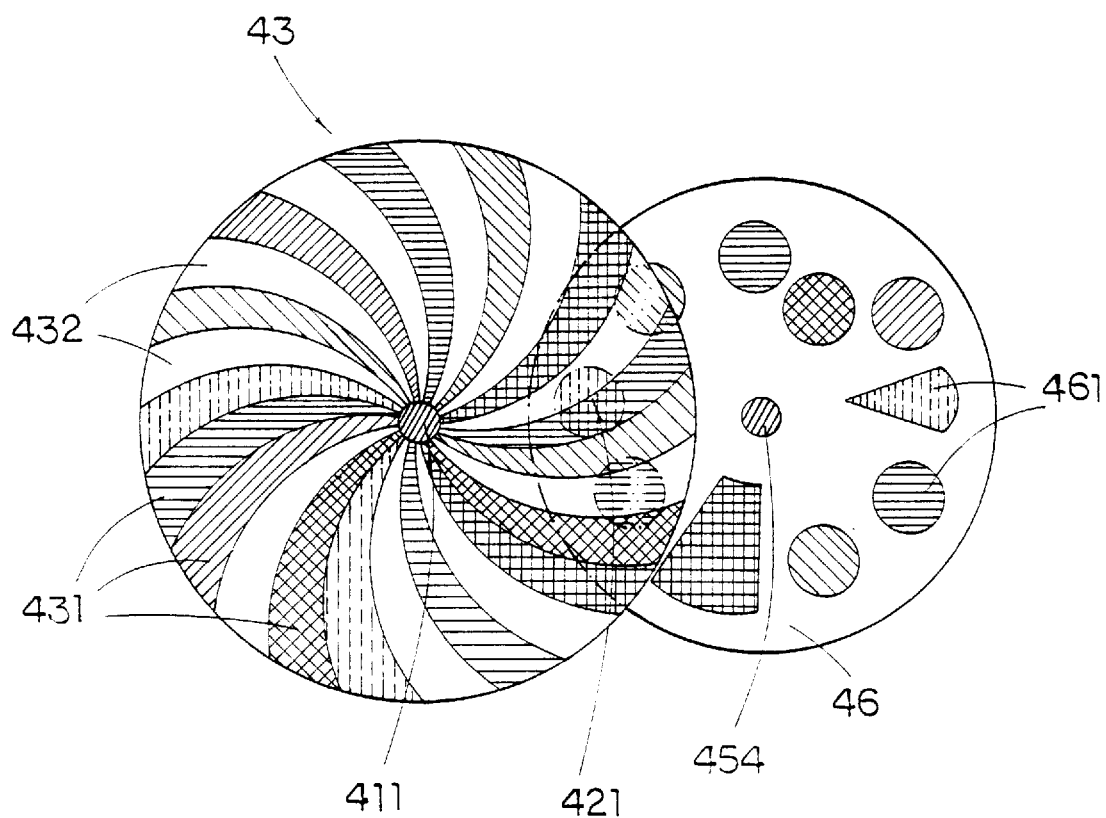
FIG. 3 is a plan view of the two overlapping light filter discs of the imitated fireworks bulb according to the above preferred embodiment of the present invention.

Referring to the FIGS. 1 to 3 of the drawings, an imitated fireworks bulb set for Christmas tree decoration according to a preferred embodiment of the present invention is illustrated. As shown in FIG. 1, the imitated fireworks bulb set 1 comprises a plurality of imitated fireworks bulbs 10, a plug head 20 having a transformer 21 therein for connecting to a electricity power source, and an elongated electrical wire 30 for electrically connecting the imitated fireworks bulbs 10 to the plug head 20 so as to connect the imitated fireworks bulbs 10 together and provide electrical power to each imitated fireworks bulb 10.

As shown in FIG. 2, Each of the imitated fireworks bulbs 10 comprises a bowl-like transparent shell 11, a conical casing 12 connected to the transparent shell 11 to form a ball shaped container body, a ring-shaped hanger 13 affixed to a top end of the casing 12 for hanging the imitated fireworks bulb to the Christmas tree, and an imitated fireworks generating device 40 installed within the casing 12.

The transparent shell 11 which is made of transparent material such as glass or plastic has a top opening 111 and an engaging rim 112 surrounding the top opening 111. According to the present embodiment, the casing 12 comprises a conical top cap 121 having a receiving cavity 122 therein and a ring shaped lighting housing 123 firmly connected between the transparent shell 11 and the top cap 121. The C-ring shaped hanger 13 is affixed to a top end of the top cap 121 for hanging on the Christmas tree. The inner top portion 121-1 of the top cap 121 downwardly secures a supporting frame 124 extended into the receiving cavity 122. A bottom edge 121-2 of the top cap 121 is connected with a top edge 123-1 of the lighting housing 123.

A circular bottom wall 123-2 is integrally formed at a bottom end of the lighting housing 123. A connecting rim 123-3 is protruded around the bottom wall 123-2 to engage with the engaging rim 112 of the transparent shell 11. A cylindrical projection sleeve 123-4 is provided at a central portion of the bottom wall 123-2, so that an interior chamber 113 of the transparent shell 11 can be communicated with a lighting chamber 123-5 of the lighting housing 123 through the projection sleeve 123-4.

The imitated fireworks generating device 40 comprises a motor 41, which is disposed inside the receiving cavity 122 of the top cap 121 and is mounted on the supporting frame 124. The motor has a driving shaft 411 downwardly extending into the lighting chamber 123-5. A stand 412 is affixed on one side of the motor 41.

The imitated fireworks generating device 40 further comprises a light socket 42 for connecting with a light bulb 421. The light socket 42 is mounted on the stand 412 and coaxially aligned with the projection sleeve 123-4. The light bulb 421 is downwardly extended into the lighting chamber 123-5 of the lighting housing 123. A bulb wire 31, which is electrically connected with the motor 41 and the light socket 42, is extended out of the top cap 121 to connect with the electrical wire 30.

A circular first light filter disc 43 is mounted on a bottom tip of the driving shaft 411 in such a manner that an edge portion 431 of the first light filter disc 43 is proximately positioned below the projecting sleeve 123-4. The first light filter disc 43 has a plurality of color strips 431 with different colors and a plurality transparent strips 432 respectively and intervally extending from a center to a circumferential edge thereof (as shown in FIG. 3), wherein each transparent strip 432 is positioned between two color strips 431.

A plurality of optic fiber sticks 44 is disposed inside the interior chamber 113 of the transparent shell 11. Each of the optic fiber sticks has a light entering end 441 gathered to form a rod-like bundle base 442 to fittedly insert into the projection sleeve 123-4, wherein the bundle base 442 is coaxially positioned below the light bulb 421. Another end of each of the optic fiber sticks 44 is a light emitting tip 443 extending outwardly and radially, wherein the outer round of the optic fiber sticks 44 have a length shorter the length of the central optic fiber sticks 44. Therefore, when the light beam emitted from the light bulb 421 directly projects onto the top end of the bundle base 442 through the first light filter disc 43 which is driven by the driving shaft 411 of the motor 41 to rotate in a predetermined speed, the color strips 431 will shade the white light beam emitted from the light bulb 421 to color lighting and the transparent strips 432 will enable the white light beam emitted form the light bulb 421 directly passing through. In other words, the white light beam emitted from the light bulb 421 will be intervally shaded by the color strips 431, so that a continuously flashing light will be transmitted to the light emitting tips 443 of the optic fiber sticks 44 to perform a fireworks like flashing effect.

In order to more efficiently dissipate the heat generated by the motor 41 and the light bulb 421, a heat sink board 50 is affixed to the bottom edge 121-2 of the top cap 121 so as to isolate the receiving cavity 122 and the lighting chamber 123-5. A center hole 51 is provided on the heat sink board 50 to enable the light socket 42 to pass through while keeping in contact with the outer surface of the light socket 42. Therefore, the heat generated by the light bulb 421 can be conducted by the heat sink board 50 to the receiving cavity 122 in order to prevent the heat being accumulated inside the lighting chamber 123-5 to soften the optic fiber sticks 44. According to the present embodiment, the heat sink board 50 is a waved metal plate to enhance the heat dissipation effect.

Moreover, a plurality of ventilating slots 121-3 are formed around the top cap 11, as shown in FIGS. 1 and 2, to rapidly dissipate the heat inside the receiving cavity 122 to the surrounding and enable the cool air outside flowing into the receiving cavity 122. The heat sink board 50 further has an unexpected side effect of preventing the light illuminating from the light bulb 421 from penetrating out through the air ventilating slots 121-3, therefore all the light beam emitting from the light bulb 421 is limited within the lighting chamber 123-5 to transmit through the optic fiber sticks 44. The heat sink board 50 can also help to support the light socket 42 in position so as to ensure the light bulb 421 being coaxially aligned with the bundle base 442.

In order to further enhance the flashing effect of the present invention with more changeful color, the imitated fireworks generating device 40 further comprises an additional driving means 45 to drive a second light filter disc 46 to rotate between the light bulb 421 and the bundle base 442 of the optic fiber sticks 44. As shown in FIG. 2, the driving means 45 comprises a driving gear 451 disposed inside the receiving cavity 122 and mounted on the driving shaft 411, an idle gear 452 positioned inside the receiving cavity 122 and being rotatably mounted on the supporting frame 124 to mesh with the driving gear 451, and a driven gear 453 which is engaged with the idle gear 452 having a drive shaft 454 rotatably supported by the supporting frame 124 to extend into the lighting chamber 123-5 for supporting the second light filter disc 46 and driving the second light filter disc 46 to rotate in a different speed of the first light filter disc 43.

As shown in FIG. 3, the second light filter disc 46, which is made of transparent material such as glass or plastic and has a larger size than that of the first light filter disc 43, provides a plurality of colored FIGS. 461 distributed on an outer circumferential portion thereof Furthermore, the second light filter disc 46 is positioned above or below the first light filter disc 43 and has an outer edge located right below the light bulb 421. In other words, when both the first and second light filter discs 43, 46 are rotating respectively in different speed, portions of the first and second light filter discs 43, 46 are remaining overlapped below the light bulb 421, so that the color strips 431 and the transparent strips 432 of the first light filter disc 43 will overlap with the different color FIGS. 461 of the second light filter disc 46 to create more colorful combination and achieve more changeful flashing effect.

Practically, both the first and second light filter discs 43, 46 are made of very thin material, so that it is quite troublesome for mounting them on the driving shaft 411 and the drive shaft 454 respectively. According to the present embodiment, two pair of rubber O-rings 433, 434, 463, 464 are utilized to mount the first and second light filter discs 43, 46 firmly in position, wherein the two rubber O-rings 433, 434 are tightly mounted on the driving shaft 411 at a position just above and below the first light filter disc 43 respectively so as to press against the upper surface and a lower surface of the first light filter disc 43. Similarly, the two rubber O-rings 463, 464 are tightly mounted on the drive shaft 454 at a position just above and below the second light filter disc 46 respectively so as to press against the upper surface and a lower surface of the second light filter disc 46.

It is worth to mention that a battery box can replace the plug head 20 if DC current is used. Besides, it is also an obvious modification to this invention by installing DC battery inside each imitated fireworks bulb to provide an independent power supply, so that the imitated fireworks bulb can be sold individually.

What is claimed is:

1. An imitated fireworks bulb set for Christmas tree decoration, comprising a plurality of imitated fireworks bulbs, a plug head having a transformer therein for electrical power supply, and an elongated electrical wire for electrically connecting said imitated fireworks bulbs to said plug head so as to connect said imitated fireworks bulbs together and provide electrical power to each of said imitated fireworks bulbs, each of said imitated fireworks bulbs comprising a bowl-like transparent shell, a casing connected to said transparent shell to form a container body, a hanger affixed to a top end of said casing, and an imitated fireworks generating device installed within said casing, said transparent shell which is made of transparent material having a top opening and an engaging rim surrounding said top opening, said casing comprising a top cap having a receiving cavity therein and a ring shaped lighting housing firmly connected between said transparent shell and said top cap, said hanger being affixed to an top end of said top cap, an inner top portion of said top cap providing a supporting frame extended into said receiving cavity, a bottom edge of said top cap is connected with a top edge of said lighting housing, a plurality of ventilating slots being formed around said top cap, a circular bottom wall being integrally formed at a bottom end of said lighting housing, a connecting rim is protruded around said bottom wall to engage with said engaging rim of said transparent shell, wherein a cylindrical projection sleeve is provided at a central portion of said bottom wall, so that an interior chamber of said transparent shell is able to communicate with a lighting chamber defined within said lighting housing through said projection sleeve, said imitated fireworks generating device comprising a motor which is disposed inside said receiving cavity of said top cap and is mounted on said supporting frame, said motor having a driving shaft downwardly extending into said lighting chamber, a light socket being mounted on a side of said motor so as to coaxially align with said projection sleeve, said light bulb being downwardly extended into said lighting chamber of said lighting housing, a bulb wire which is electrically connected with said motor and said light socket is extended out of said top cap to connect with said electrical wire, a circular first light filter disc being mounted on said driving shaft in such a manner that an edge portion of said first light filter disc is proximately positioned below said projecting sleeve, said first light filter disc having a plurality of color strips of different colors and a plurality transparent strips respectively and intervally extending from a center to a circumferential edge thereof, wherein each of said transparent strips is positioned between every two of said color strips, a plurality of optic fiber sticks being disposed inside said interior chamber of said transparent shell, each of said optic fiber sticks having a light entering end gathered to form a rod-like bundle base to fittedly insert into said projection sleeve, wherein said bundle base is coaxially positioned below said light bulb, another end of each of said optic fiber sticks being a light emitting tip extending outwardly and radially, thereby, when a light beam emitted from said light bulb directly projects onto said top end of said bundle base through said first light filter disc which is driven by said driving shaft of said motor to rotate in a predetermined speed, said color strips shade said light beam emitted from said light bulb to color lighting and said transparent strips enables said light beam emitted form said light bulb directly passing through, so that said light beam emitted from said light bulb is intervally shaded by said color strips, and that a continuously flashing light is transmitted to said light emitting tips of said optic fiber sticks to perform a fireworks like flashing effect, and a heat sink board being affixed to said bottom edge of said top cap so as to isolate said receiving cavity and said lighting chamber, a center hole being provided on said heat sink board to enable said light socket to pass through while keeping in contact with an outer surface of said light socket.

2. An imitated fireworks bulb set for Christmas tree decoration as recited in claim 1 wherein said heat sink board is a waved metal plate for enhancing heat dissipation effect.

3. An imitated fireworks bulb set for Christmas tree decoration as recited in claim 1, wherein each of said imitated fireworks bulbs further comprises a driving means for transmitting the power of said motor to drive a second light filter disc to rotate between said light bulb and said bundle base of said optic fiber sticks.

4. An imitated fireworks bulb set for Christmas tree decoration as recited in claim 3 wherein said driving means comprises a driving gear disposed inside said receiving cavity and mounted on said driving shaft, at least an idle gear positioned inside said receiving cavity and being rotatably mounted on said supporting frame to mesh with said driving gear, and a driven gear which is engaged with said idle gear having a drive shaft rotatably supported by said supporting frame to extend into said lighting chamber for supporting said second light filter disc and driving said second light filter disc to rotate in a different speed of said first light filter disc.

5. An imitated fireworks bulb set for Christmas tree decoration as recited in claim 3, wherein said second light filter disc is made of transparent material and provides a plurality of colored figures distributed on an outer circumferential portion thereof, wherein said second light filter disc is positioned in proximate with said first light filter disc and has an outer edge located right below said light bulb, so that when both said first and second light filter discs are rotating respectively in different speed, portions of said first and second light filter discs are remaining overlapped below said light bulb.

6. An imitated fireworks bulb set for Christmas tree decoration as recited in claim 4 wherein said second light filter disc, which is made of transparent material and has a predetermined larger size than that of said first light filter disc, provides a plurality of colored figures distributed on an outer circumferential portion thereof, wherein said second light filter disc is positioned in proximate with said first light filter disc and has an outer edge located right below said light bulb, so that when both said first and second light filter discs are rotating respectively in different speed, portions of said first and second light filter discs are remaining overlapped below said light bulb.

7. An imitated fireworks bulb set for Christmas tree decoration as recited in claim 1 wherein a pair of rubber O-rings are utilized to mount said first light filter discs firmly in position, wherein said pair of rubber O-rings are tightly mounted on said driving shaft at a position just above and below said first light filter disc respectively so as to press against an upper surface and a lower surface of said first light filter disc.

8. An imitated fireworks bulb set for Christmas tree decoration as recited in claim 3 wherein two pair of rubber O-rings are utilized to mount said first and second light filter discs firmly in position, wherein said first pair of rubber O-rings are tightly mounted on said driving shaft at a position just above and below said first light filter disc respectively so as to press against an upper surface and a lower surface of said first light filter disc, and that said second pair of rubber O-rings are tightly mounted on said drive shaft at a position just above and below said second light filter disc respectively so as to press against an upper surface and a lower surface of said second light filter disc.

9. An imitated fireworks bulb set for Christmas tree decoration as recited in claim 6 wherein two pair of rubber O-rings are utilized to mount said first and second light filter discs firmly in position, wherein said first pair of rubber O-rings are tightly mounted on said driving shaft at a position just above and below said first light filter disc respectively so as to press against an upper surface and a lower surface of said first light filter disc, and that said second pair of rubber O-rings are tightly mounted on said drive shaft at a position just above and below said second light filter disc respectively so as to press against an upper surface and a lower surface of said second light filter disc.

10. An imitated fireworks bulb set for Christmas tree decoration, comprising a plurality of imitated fireworks bulbs, a plug head having a transformer therein for electrical power supply, and an elongated electrical wire for electrically connecting said imitated fireworks bulbs to said plug head so as to connect said imitated fireworks bulbs together and provide electrical power to each of said imitated fireworks bulbs, each of said imitated fireworks bulbs comprising a bowl-like transparent shell, a casing connected to said transparent shell to form a container body, a hanger affixed to a top end of said casing, and an imitated fireworks generating device installed within said casing, said transparent shell which is made of transparent material having a top opening and an engaging rim surrounding said top opening, said casing having a receiving cavity at an upper portion and a lighting chamber at a lower portion, a circular bottom wall being integrally formed at a bottom end of said casing, wherein a cylindrical projection sleeve is provided at a central portion of said bottom wall, so that an interior chamber of said transparent shell is able to communicate with said lighting chamber of said casing through said projection sleeve, said imitated fireworks generating device comprising a motor which is disposed inside said receiving cavity of said top cap and is mounted on said supporting frame, said motor having a driving shaft downwardly extending into said lighting chamber, a light socket being mounted on a side of said motor so as to coaxially align with said projection sleeve, said light bulb being downwardly extended into said lighting chamber of said lighting housing, a bulb wire which is electrically connected with said motor and said light socket is extended out of said top cap to connect with said electrical wire, a circular first light filter disc being mounted on said driving shaft in such a manner that an edge portion of said first light filter disc is proximately positioned below said projecting sleeve, said first light filter disc having a plurality of color strips of different colors and a plurality transparent strips respectively and intervally extending from a center to a circumferential edge thereof, wherein each of said transparent strips is positioned between every two of said color strips, a second light filter disc which is made of transparent material and provided with a plurality of colored figures distributed on an outer circumferential portion thereof, wherein said second light filter disc is positioned in proximate with said first light filter disc and has an outer edge located right below said light bulb, wherein said second light filter disc provides a plurality of colored figures distributed on an outer circumferential portion thereof, so that when both said first and second light filter discs are rotating respectively in different speed, portions of said first and second light filter discs are remaining overlapped below said light bulb, said imitated fireworks generating device further comprising a driving means for transmitting the power of said motor to drive said second light filter disc to rotate below said light bulb, and a plurality of optic fiber sticks being disposed inside said interior chamber of said transparent shell, each of said optic fiber sticks having a light entering end gathered to form a rod-like bundle base to fittedly insert into said projection sleeve, wherein said bundle base is coaxially positioned below said light bulb, another end of each of said optic fiber sticks being a light emitting tip extending outwardly and radially, thereby, when a light beam emitted from said light bulb directly projects onto said top end of said bundle base through said first light filter disc which is driven by said driving shaft of said motor to rotate in a predetermined speed, said color strips and said color figures shade said light beam emitted from said light bulb to color lighting and said transparent strips enables said light beam emitted form said light bulb directly passing through, so that said light beam emitted from said light bulb is intervally shaded by said color strips and said color figures, and that a continuously flashing light is transmitted to said light emitting tips of said optic fiber sticks to perform a fireworks like flashing effect.

11. An imitated fireworks bulb set for Christmas tree decoration as recited in claim 10 wherein said driving means comprises a driving gear disposed inside said receiving cavity and mounted on said driving shaft, at least an idle gear positioned inside said receiving cavity and being rotatably mounted on said supporting frame to mesh with said driving gear, and a driven gear which is engaged with said idle gear having a drive shaft rotatably supported by said supporting frame to extend into said lighting chamber for supporting said second light filter disc and driving said second light filter disc to rotate in a different speed of said first light filter disc.

12. An imitated fireworks bulb set for Christmas tree decoration as recited in claim 10 wherein two pair of rubber O-rings are utilized to mount said first and second light filter discs firmly in position, wherein said first pair of rubber O-rings are tightly mounted on said driving shaft at a position just above and below said first light filter disc respectively so as to press against an upper surface and a lower surface of said first light filter disc, and that said second pair of rubber O-rings are tightly mounted on said drive shaft at a position just above and below said second light filter disc respectively so as to press against an upper surface and a lower surface of said second light filter disc.

13. An imitated fireworks bulb set for Christmas tree decoration as recited in claim 11 wherein two pair of rubber O-rings are utilized to mount said first and second light filter discs firmly in position, wherein said first pair of rubber O-rings are tightly mounted on said driving shaft at a position just above and below said first light filter disc respectively so as to press against an upper surface and a lower surface of said first light filter disc, and that said second pair of rubber O-rings are tightly mounted on said drive shaft at a position just above and below said second light filter disc respectively so as to press against an upper surface and a lower surface of said second light filter disc.

14. An imitated fireworks bulb set for Christmas tree decoration as recited in claim 10 wherein a heat sink board is affixed inside said casing to isolate said receiving cavity and said lighting chamber, a center hole being provided on said heat sink board to enable said light socket to pass through while keeping in contact with an outer surface of said light socket, and that a plurality of ventilating slots are formed around said upper portion of said casing.

15. An imitated fireworks bulb set for Christmas tree decoration as recited in claim 14 wherein said heat sink board is a waved metal plate for enhancing heat dissipation effect.

16. An imitated fireworks bulb set for Christmas tree decoration as recited in claim 11 wherein a heat sink board is affixed inside said casing to isolate said receiving cavity and said lighting chamber, a center hole being provided on said heat sink board to enable said light socket to pass through while keeping in contact with an outer surface of said light socket, and that a plurality of ventilating slots are formed around said upper portion of said casing.

17. An imitated fireworks bulb set for Christmas tree decoration as recited in claim 16 wherein said heat sink board is a waved metal plate for enhancing heat dissipation effect.

18. An imitated fireworks bulb set for Christmas tree decoration as recited in claim 12 wherein a heat sink board which is a waved metal plate is affixed inside said casing to isolate said receiving cavity and said lighting chamber, a center hole being provided on said heat sink board to enable said light socket to pass through while keeping in contact with an outer surface of said light socket, and that a plurality of ventilating slots are formed around said upper portion of said casing.

19. An imitated fireworks bulb set for Christmas tree decoration as recited in claim 13 wherein a heat sink board which is a waved metal plate is affixed inside said casing to isolate said receiving cavity and said lighting chamber, a center hole being provided on said heat sink board to enable said light socket to pass through while keeping in contact with an outer surface of said light socket, and that a plurality of ventilating slots are formed around said upper portion of said casing.

* * * * *